United States Patent [19]

Gustavsen

[11] Patent Number: 4,999,923

[45] Date of Patent: Mar. 19, 1991

[54] CARPET MEASURING STRAP AND SLING ASSEMBLY AND METHOD OF CUTTING CARPET TO LENGTH

[76] Inventor: Willard Gustavsen, 12142 Range Line, Berrien Springs, Mich. 49103

[21] Appl. No.: 553,211

[22] Filed: Jul. 13, 1990

[51] Int. Cl.$^5$ .............................................. G01B 5/04
[52] U.S. Cl. ................................. 33/733; 242/67.3 R
[58] Field of Search .......... 33/732, 733, 754, 750–753, 33/744; 83/522; 242/67.3 R, DIG. 3

[56] References Cited

U.S. PATENT DOCUMENTS 1,780,647 11/1930 Heavey .................................. 33/733
3,788,175 1/1974 DAvis .................................. 33/733 X Primary Examiner—Harry N. Haroian
Attorney, Agent, or Firm—Dykema Gossett

[57] ABSTRACT

The carpet measuring strap and sling assembly of this invention provides a simple and inexpensive method of cutting a predetermined length of carpet from a carpet roll. The assembly preferably includes at least two flexible inelastic straps which are preferably releasably joined at their respective ends to form flat loop slings which are received in space relation around the carpet roll when the carpet roll is rotatably supported in a horizontal orientation spaced above floor level. The carpet is then unrolled vertically into the strap slings and cut to length. In the preferred embodiment, at least one of the straps is marked incrementally on its outer surface with a scale for measuring length, whereby the length of the carpet unrolled is measured by the strap as the carpet is unrolled.

16 Claims, 1 Drawing Sheet

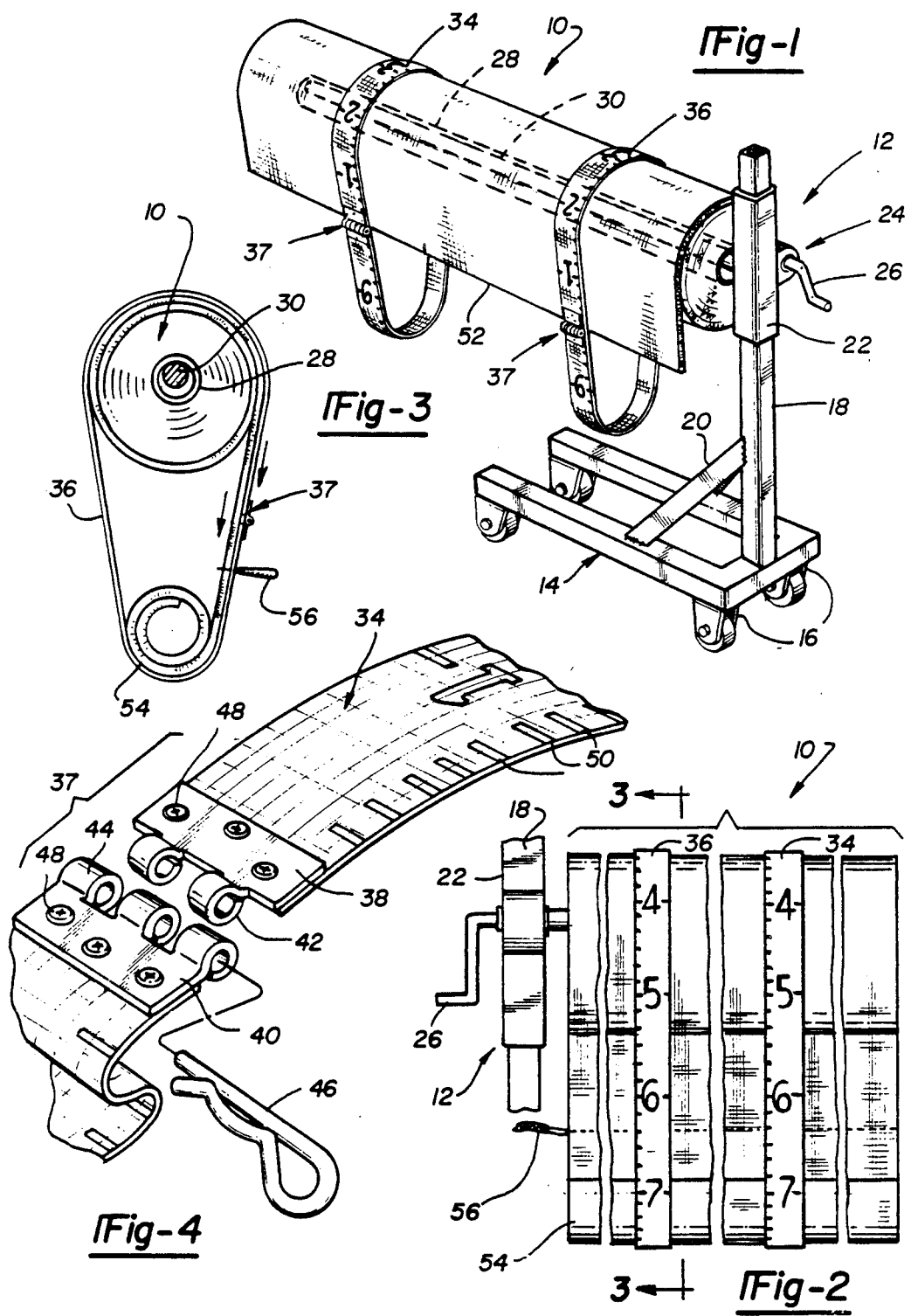

CARPET MEASURING STRAP AND SLING ASSEMBLY AND METHOD OF CUTTING CARPET TO LENGTH

FIELD AND BACKGROUND OF THE INVENTION

The present invention relates to a simple and relatively inexpensive strap and sling assembly for measuring carpet as the carpet is unrolled from a conventional carpet roll and a method of cutting a predetermined length of carpet from the roll using the strap and sling assembly of this invention.

Conventional carpet rolls are heavy, long and difficult to handle. A carpet roll typically weighs 500 to 600 pounds, but may weight as much as 1,000 pounds. The carpet is rolled on a cardboard tube and the length of the carpet rolled on the tube is generally 100 to 175 feet forming a carpet roll having a diameter generally of about 2 to 2½ feet. The length of the carpet roll is, of course, the width of the carpet and is generally 12 feet, although carpet rolls having a width of 13½ feet are also commercial.

The carpet roll must be cut to the desired length by either the distributor or the installer. This is accomplished either by hand or by using a commercial carpet cutting machine. Larger carpet distributors use a commercial carpet cutting machine which requires substantial floor space and costs thousands of dollars. A typical carpet cutting machine has a plurality of horizontal motorized rollers on either side of a cutter bed. These machines are generally not portable and therefore the carpet must be cut at the carpet distributor or warehouse and trimmed to size at the installation site.

Many carpet stores and installers cannot afford the substantial cost of commercial carpet cutting machines or do not have the floor space required for such machines. Further, it would be more desirable in some commercial installations, for example, to cut the carpet to length from the carpet roll at the installation site where the measurements can be double checked. Where the carpet is cut to length by hand, the carpet is unrolled on the floor, measured and cut by hand. This is a difficult task because of the bulk and size of the carpet roll and requires sufficient floor space to unroll the carpet to the desired length. Further, the installer must be careful not to cut the flooring.

Thus, there is a substantial need for an inexpensive carpet cutting device which preferably does not require significantly greater floor space than the carpet roll itself and which is simple to handle and operate. The most preferred carpet cutting device is one that can be used either at the carpet store or the job site and is easily transportable. The carpet strap and sling assembly of this invention accomplishes these objects and provides a simple and efficient method of cutting a carpet roll to length.

SUMMARY OF THE INVENTION

The carpet measuring strap and sling assembly of this invention is preferably utilized in combination with a carpet support device which supports the carpet in a horizontal orientation spaced above floor level and wherein the carpet roll may be unrolled vertically toward the floor level. As set forth above, a carpet roll is formed by rolling or winding the carpet on a cardboard tube. The carpet roll may be supported on a horizontal rod received through the tube spaced above floor level.

The strap and sling assembly of this invention preferably includes at least two flexible inelastic straps having substantially the same length, although one wider strap may be used. The common length of the straps is substantially greater than the circumference of the carpet rolls to be measured and the straps are each joined at their respective ends to form a flat continuous loop sling. The continuous straps are received around the carpet roll in spaced relation with the carpet roll rotatably supported horizontally, as described above. The carpet roll is then rotated to unroll a predetermined length of carpet from the roll and the end portion of the carpet is received in the free lower loop portions of the straps as the carpet is enrolled. The carpet may then be cut to length while the end portion is supported in the free lower loop portions of the straps, releasing the cut end portion into the sling formed by the straps.

In the preferred embodiment of the invention, at least one of the straps is marked incrementally on its outer surface along the continuous length of the loop with a scale for measuring length, such that the length of the carpet unrolled from the carpet roll may be simultaneously measured. It will be understood, however, that alternative measuring devices may also be utilized. The straps preferably have a roughened surface, such that the straps rotate with the carpet roll for accurate measurement. In the most preferred embodiment, the straps are knit from an inelastic synthetic fiber forming a thin flexible inelastic strap having a roughened exterior surface to grip the surface of the carpet as the carpet roll is rotated. It is also desirable for the ends of each strap to be releasably inter-connected for use on a carpet roll where both ends of the carpet are supported on a frame assembly or the like. That is, neither end of the carpet may be free to receive the straps. In the most preferred embodiment, the ends of the straps are releasably inter-connected by a hinge assembly, wherein the hinge pin may be removed. The preferred scale for measuring length has a base ten, such as 10 feet or 10 yards, such that any length of carpet may be easily measured using the strap and sling assembly of this invention.

Other advantages and meritorious features of this invention will be more fully understood from the appended claims, the following description of the preferred embodiments and the drawings, a brief description of which follows:

BRIEF DESCRIPTION OF THE DRAWINGS

FIG. 1 is a perspective side view of one embodiment of the strap and sling assembly of this invention;

FIG. 2 is a partial side view of the assembly shown in FIG. 1 viewed from the opposite side following partial unrolling of the carpet;

FIG. 3 is an end cross-sectional view of the strap and sling assembly shown in FIG. 2 in the direction of view arrows 3—3; and FIG. 4 is a perspective view of a preferred embodiment of a strap of the strap and sling assembly of this invention.

DESCRIPTION OF THE PREFERRED EMBODIMENTS OF THE METHOD OF THIS INVENTION

FIG. 1 illustrates a conventional carpet roll 10 rotatably mounted on a support member 12 of my design. The disclosed embodiment of the support member includes a U or C-shaped base portion 14 having four rotatable coaster assemblies 16 supporting the base member. The support member includes a vertical stanchion 18 which is supported in vertical relation by braces 20. A rectangular tube 22 is telescopically received on the vertical stanchion 18 and a conventional winch assembly 24 is mounted on the tube 22. As disclosed, the winch assembly 24 is a conventional hand operated winch having a handle 26 which rotates gearing within the winch assembly. In a typical application, the stanchion 18 includes a plurality of spaced slots which are engaged by the gearing of the winch assembly to raise and lower the tube 22.

As will be understood from the above description of a conventional carpet roll, the support member 12 must be able to support a carpet roll weighing up to 1,000 pounds and having a length up to 13½ feet. The arms of the C-shaped base 14 may be extended, as required, to accommodate the length of the carpet roll from the floor level. The stanchion 18 and base member 14 may be formed of square or rectangular steel tubing and the stanchion, base member and braces 20 may be welded together for strength. The base member 14 is preferably supported on casters 16 to move the carpet roll 10, as desired.

As described above, the carpet roll 10 comprises a carpet rolled on a cardboard tube 28, as best shown in FIG. 3. The support member 12 includes a rod 30 attached to the tube 22. Thus, the carpet roll 10 may be raised or lowered by rotating the handle 26 of the winch assembly 24. Further, the carpet roll may be moved to any convenient location on the support member 12. Finally, the carpet roll 10 is freely rotatable on the support rod 30 in the horizontal orientation shown in FIG. 1 for utilization of the carpet measuring strap and sling assembly now described.

As described above, the carpet measuring strap and sling assembly of this invention preferably includes at least two continuous straps 34 and 36 which are received around the carpet roll and oriented as shown in FIG. 1. As described above, the standard carpet roll has a width of 12 feet. Thus, the straps 34 and 36 are preferably located about 3 feet from the side edges of the carpet or the ends of the carpet roll. As best shown in FIG. 4, the ends of the carpet measuring straps of this invention are preferably releasably inter-connected to form a flat coil (see also FIG. 1), which serves as a sling, as described below. In the most preferred embodiment, the ends of the carpet straps are releasably inter-connected by a hinge assembly 37 as best shown in FIG. 4. The hinge assembly includes hinge members 38 and 40 each having loops 40 and 42, respectively, which are interdigitated to align the apertures through the loops 42 and 44 and receive the releasable hinge pin 46. In the disclosed embodiment, the hinge pin 46 is in the shape of a U-shaped cotter pin, but is formed of high carbon spring steel, rather than malleable iron. In the disclosed embodiment, the hinge members 38 and 40 are attached to the strap 34 (see FIG. 4) by philip head 48 screws and nuts (not shown) to permit adjustment of the length of the strap as required for accurate measurement. As will be understood, however, the hinge members may be attached to the strap by any suitable means, including rivets or the like.

The straps 34 and 36 are preferably formed of a flexible inelastic material to provide accurate measurement of the carpet unrolled. In the disclosed embodiment, the straps are formed from a loosely knit inelastic synthetic fiber, such as a polyester. The loosely knit polyester strap also has relatively rough exterior surface to grip the carpet and rotate with the carpet, as described below. Finally, the preferred embodiment of the carpet measuring straps include scale markings 50 for measuring the length of the carpet unrolled, as also described below.

With the carpet roll 10 rotatably supported in a horizontal orientation as shown in FIG. 1, the carpet measuring straps 34 and 36 are located around the carpet roll in spaced relation, as shown in FIG. 1. In the preferred embodiment, the hinge assembly 37 is the "Zero" location on the continuous straps and is therefore aligned with the free end 52 of the carpet roll as shown in FIG. 1. The carpet is then unrolled from the carpet roll 10 as shown in FIGS. 2 and 3 and the length of carpet unrolled is simultaneously measured by the markings 50 straps 34 and 36 until a predetermined length of carpet has been unrolled from the carpet roll. In the most preferred embodiment, the straps are marked in a scale of a base ten, such as 10 feet, 10 yards or 10 meters, such that the straps will conveniently measure any length of carpet unrolled. For example, in a typical application, where the strap is marked in a 10 foot scale and 31 feet is to be unrolled from the carpet, the carpet roll is rotated until the straps have rotated through three revolutions plus one foot (i.e. $3 \times 10$ feet + 1 foot). Thus, the carpet measuring straps of this invention will conveniently measure any length of carpet received from the roll. Further, as will be understood, only one strap need be marked. In fact, the carpet measuring strap and sling assembly of this invention may also utilize unmarked straps where other means are utilized to measure the length of carpet unrolled from the carpet roll, such as a counter associated with the rod 30 and support member 12. In the preferred embodiment, however, at least one of the straps 34 or 36 is marked incrementally on its outersurface along the continuous length of the loop for measuring the length of the carpet unrolled from the carpet roll 10.

Another important feature of the strap assembly is the fact that the straps 34 and 36 serve as a sling and support during cutting of the carpet, as now described. As the carpet is unrolled from the carpet roll 10 as shown in FIG. 1, the unrolled carpet is received in the free lower loop portions of the straps, as best shown in FIGS. 2 and 3. The free end 52 of the carpet may then be rolled into a separate lower roll 54, as shown in FIGS. 2 and 3, as the carpet is unrolled from the main roll 10. When a predetermined length of carpet has been unrolled as measured by the straps 34 and 36, the predetermined length may be cut from the main carpet roll 10 with a conventional carpet knife 56 as shown in FIG. 2 and 3. The cut length may first be marked with a straight edge and chalk or the carpet may simply be cut using the scale markings on the strap as a guide, as shown in FIG. 2.

Having described the preferred embodiment of the carpet measuring and strap assembly 34 and 36 of this invention, the method of cutting a predetermined length of carpet from a carpet roll will now be understood. The method includes first supporting the carpet roll 10 in a generally horizontal orientation spaced above floor level on a support means, such as the rod 30, which permits rotation of the carpet roll to unroll an end portion 52 vertically from the carpet roll. At least one continuous strap is then located around the carpet roll. As will now be understood, the strap should have a length which is substantially greater than the circumference of the carpet roll, such that the strap includes a free lower loop portion spaced above the floor level for receiving the free end 52 of the carpet roll. Where only one strap is utilized, the strap would preferably have a width substantially greater than the width of the straps 34 and 36 shown in FIG. 1. The embodiment of the straps shown in FIG. 1 have a width of about 4 inches and a thickness of about 1/16 inch. As described below, the thickness of the strap should be kept as thin as possible to provide accurate measurement of the carpet.

With the straps oriented as shown in FIG. 1 with the "Zero" marking of the hinge members 37 aligned with the end 52 of the carpet roll, the carpet is rotated to unroll a predetermined length of carpet from the carpet roll and the end portion 52 of the carpet is received in the free lower loop portions of the straps 34 and 36 as the carpet is unrolled. Finally, the carpet is cut to the predetermined length, preferably while the end portion of the carpet is supported in the strap free lower loop portions, as shown in FIGS. 2 and 3.

As described, at least one of the straps 34 and 36 in the preferred embodiment of the invention is marked incrementally on its outer surface along the continuous length of the loop with a scale for measuring length, as shown at 50 in FIG. 4. In the most preferred embodiment, the scale marking is on a base ten, such that any length of carpet may be conveniently measured, as described above. However, the scale marked on the straps is not exactly equal to the linear length of the strap. Although the dimensional relationship is not fully understood, the "error" has been found to be proportionate to the thickness of the strap. That is, a thinner strap produces less error than a thicker strap. Utilizing a strap having a thickness of 1/16 inch, the length of the "10 foot" strap must be equal to 10 foot ⅝ inches or 1/16 inch (the width of the strap) for each foot of the scale.

Thus, the carpet measuring strap and sling assembly of this invention provides a simple and accurate method of cutting a predetermined length of carpet from a carpet roll. The storage space required for measuring and cutting the carpet to length is essentially equivalent to the dimensions of the carpet roll and the cost of the assembly is relatively inexpensive when compared to commercial carpet cutting machines.

Having described the carpet measuring and sling assembly and the method of this invention, it will be understood that various modifications may be made to the described assembly and method within the purview of the appended claims. For example, a continuous sewn or solid strap may be used rather than providing a hinge assembly as shown in FIG. 4. Further, other carpet roll support means may be utilized, including conventional carpet roll supports, provided the carpet roll is rotatably supported in a generally supported horizontal orientation. Finally, other means may be utilized to measure the length of carpet rolled from the carpet roll 10 although, in the preferred embodiment, at least one of the straps is marked with a scale for measuring length, as described above.

Having described the preferred embodiments and method of my invention, I now claim the invention as follows:

1. A method of cutting a predetermined length of carpet from a carpet roll, comprising the following steps:
   (a) supporting said carpet roll in a generally horizontal orientation spaced above floor level on a support means, said support means permitting rotation of said carpet roll to unroll an end portion of said carpet;
   (b) locating at least one continuous strap having a length substantially greater than the circumference of said carpet roll around said carpet roll, the ends of said strap being joined to form a flat continuous loop having a free end portion spaced above said floor level;
   (c) rotating said carpet roll on said support means to unroll said predetermined length of carpet from said roll vertically into said free lower loop portion of said strap as said carpet is unrolled and;
   (d) cutting said carpet end portion to said predetermined length while said end portion is supported in said strap free lower loop portion.

2. The method of cutting a predetermined length of carpet as defined in claim 1, wherein said method includes locating at least two continuous straps around said carpet roll in spaced relation, said straps having substantially the same length, each strap having a free lower loop portion generally equally spaced above said floor level, said lower loop portions of said straps forming a sling for receiving said carpet end portion, said method further including rotating said carpet roll on said support means to enroll said predetermined length of carpet from said roll vertically into said strap sling.

3. The method of cutting a predetermined length of carpet as defined in claim 2, wherein said method includes rolling said carpet end portion in said strap sling as said carpet is enrolled into said straps.

4. The method of cutting a predetermined length of carpet as defined in claim 1, wherein said strap is marked incrementally with a scale for measuring length, said method including rotating said carpet roll and simultaneously rotating said continuous strap and measuring the unrolled length of said carpet end portion using said scale.

5. A method of cutting a predetermined length of carpet from a carpet roll, comprising the following steps:
   (a) supporting said carpet roll on a support means, said support means supporting said carpet roll with the axis of said carpet roll generally horizontally spaced above floor level and permitting rotation of said carpet roll to unroll an end portion of said carpet;
   (b) locating at least two continuous straps in spaced relation around said carpet roll, said straps having substantially the same length, said length being substantially greater than the circumference of said carpet roll, said straps being joined at their respective ends forming a flat loop having a free lower loop portion spaced generally equally above said floor level forming a sling for receiving said carpet end portion;
   (c) rotating said carpet roll on said support means to unroll said predetermined length of carpet from said roll into said sling formed by said free lower loop portions of said straps; and
   (d) cutting said carpet end portion to said predetermined length while said carpet end portion is supported in said free lower loop portions of said straps.

6. The method of cutting a predetermined length of carpet as defined in claim 5, wherein at least one of said straps is marked incrementally with a scale for measuring length, said method including rotating said carpet roll and simultaneously rotating said continuous straps and measuring the unrolled length of said carpet end portion received in said straps using said scale.

7. The method of cutting a predetermined length of carpet as defined in claim 6, wherein said method includes rolling said carpet end portion in said sling as said carpet is unrolled into said free lower loop portions of said straps as said carpet is unrolled from said roll into said straps.

8. A carpet measuring strap and sling assembly for measuring carpet as the carpet is unrolled from a carpet roll rotatably supported in horizontal orientation spaced above floor level, said assembly comprising at least two flexible inelastic straps having substantially the same length, said length of said straps being substantially greater than the circumference of the carpet roll to be measured, said straps each joined at their respective ends to form flat continuous loop slings for receipt around the carpet rolls to be measured and said slings receiving the end of the carpet as it is unrolled, and at least one of said straps being marked incrementally on its outer surface along the continuous length of said loop with a scale for measuring length, whereby the length of the carpet unrolled from the carpet roll may be measured.

9. The carpet measuring strap and sling assembly defined in claim 8, characterized in that said straps are each joined at their respective ends by a hinge.

10. The carpet measuring strap and sling assembly defined in claim 9, characterized in that each of said straps includes a hinge portion at each end thereof and said hinge portions being releasably inner connected by a removable hinge pin.

11. The carpet measuring strap and sling assembly defined in claim 8, characterized in that said straps are formed from a knit inelastic synthetic fiber forming a thin flexible inelastic strap having a roughened exterior surface which grips the surface of the carpet roll to rotate with the carpet roll and for measuring the length of carpet unrolled from the carpet roll.

12. The carpet measuring strap and sling assembly defined in claim 8, characterized in that at least one of said straps is marked in a 10 foot scale forming a base ten for measuring any length of carpet from said carpet roll.

13. The carpet measuring strap and sling assembly defined in claim 12, characterized in that said 10 foot scale is greater than 10 feet to accommodate the thickness of said strap.

14. A carpet measuring strap and sling assembly for measuring carpet as the carpet is unrolled from a carpet roll rotatably supported in a horizontal orientation spaced above floor level, said assembly comprising at least two flexible inelastic straps having substantially the same length, said length being substantially greater than the circumference of the carpet rolls to be measured, the ends of each of said straps being releasably joined to form a flat continuous loop sling for receipt around the carpet rolls to be measured and said sling receiving the end of the carpet as the carpet is unrolled, said straps being relatively thin, each strap having a substantial width for supporting the unrolled carpet, and at least one of said straps being marked on its outer surface along the continuous length of said strap with a scale of ten for measuring the length, whereby the length of the carpet unrolled may be measured using a base ten.

15. The carpet measuring strap and sling assembly defined in claim 14, characterized in that said straps are each joined at their respective ends with a hinge member and said straps are releasably inter-connected by a removable hinge pin.

16. The carpet measuring strap and sling assembly defined in claim 14, characterized in that said straps are formed from a knit inelastic synthetic fiber forming a thin flexible inelastic strap having a roughened exterior surface which grips the surface of the carpet roll to rotate with the carpet roll and measure the length of the carpet unrolled.

* * * * *